(12) United States Patent
Clement et al.

(10) Patent No.: US 10,761,508 B2
(45) Date of Patent: *Sep. 1, 2020

(54) CLIENT INITIATED VENDOR VERIFIED TOOL SETTING

(71) Applicant: INOVATECH ENGINEERING CORPORATION, Vankleek Hill (CA)

(72) Inventors: Miguel Clement, St-Pascal (CA); Stephane Menard, Coteau-du-Lac (CA); Dominique Bruneau, Orleans (CA); David Gabriels, Egbert (CA)

(73) Assignee: LINCOLN ELECTRIC COMPANY OF CANADA LP, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,573

(22) Filed: May 23, 2019

(65) Prior Publication Data

US 2019/0278256 A1 Sep. 12, 2019

Related U.S. Application Data

(63) Continuation of application No. 15/266,404, filed on Sep. 15, 2016, now Pat. No. 10,365,636.

(Continued)

(51) Int. Cl.
*G06F 19/00* (2018.01)
*G05B 19/408* (2006.01)
*G05B 19/414* (2006.01)

(52) U.S. Cl.
CPC ....... *G05B 19/4083* (2013.01); *G05B 19/414* (2013.01); *G05B 2219/31103* (2013.01);
(Continued)

(58) Field of Classification Search
CPC .............. G05B 19/4083; G05B 19/414; G05B 2219/35513; G05B 2219/31103; G05B 2219/31422
See application file for complete search history.

(56) References Cited

U.S. PATENT DOCUMENTS

| | | | |
|---|---|---|---|
| 7,702,536 B1 * | 4/2010 | Alabraba | G06Q 30/02 705/14.16 |
| 2002/0120882 A1 * | 8/2002 | Sarangi | G06F 1/24 713/600 |

(Continued)

*Primary Examiner* — Adam Lee

(57) ABSTRACT

Computer (or computerized) numerical control (CNC) tools are employed globally. Whilst these may be purchased with an initial set of configurations users must establish any other configurations themselves leading to potentially every CNC tool being configured slightly differently for the same process requirement even before considering new materials, tool elements etc. Accordingly, users and manufacturers would benefit from access to updated process parameters for machine tools that reflect scenarios encountered in manufacturing operations that are new or lead to improved tolerances, yields, reducing process time etc. However, users are not going to employ just any set of parameters given to them as these may damage their CNC tool or tool elements. Embodiments of the invention provide a subscription service providing access to verified settings where the verification is performed by the machine tool manufacturer or machine tool element manufacturer.

15 Claims, 6 Drawing Sheets

Related U.S. Application Data

(60) Provisional application No. 62/218,611, filed on Sep. 15, 2015.

(52) U.S. Cl.
CPC ............ *G05B 2219/31422* (2013.01); *G05B 2219/35513* (2013.01)

(56) References Cited

U.S. PATENT DOCUMENTS

| | | | |
|---|---|---|---|
| 2003/0050869 A1* | 3/2003 | Bruynsteen | G06Q 10/10 705/28 |
| 2003/0053798 A1* | 3/2003 | Roshanski | H04N 5/76 386/230 |
| 2004/0093289 A1* | 5/2004 | Bodin | G08G 1/205 705/32 |
| 2004/0260920 A1* | 12/2004 | Arnfield | G06F 9/44505 713/100 |
| 2006/0173979 A1* | 8/2006 | Roellgen | H04L 41/0253 709/221 |
| 2007/0083303 A1* | 4/2007 | O'Sullivan | G07C 5/0808 701/31.4 |
| 2007/0282694 A1* | 12/2007 | Gould | G06Q 30/0239 705/14.39 |
| 2008/0030322 A1* | 2/2008 | Stauffer | H04L 41/12 340/539.2 |
| 2008/0201493 A1* | 8/2008 | Richardson | 710/15 |
| 2008/0274765 A1* | 11/2008 | Lopez | G06F 8/60 455/552.1 |
| 2010/0017794 A1* | 1/2010 | Waters | G06F 8/65 717/171 |
| 2010/0217478 A1* | 8/2010 | Zhang | G07C 5/006 701/31.4 |
| 2011/0015962 A1* | 1/2011 | Finucan | G06Q 30/06 705/305 |
| 2013/0151064 A1* | 6/2013 | Becker | G07C 5/008 701/31.4 |
| 2014/0179222 A1* | 6/2014 | Chaudhary | H04B 5/0031 455/41.1 |
| 2015/0065105 A1* | 3/2015 | Masterson | H04W 8/205 455/418 |
| 2015/0074749 A1* | 3/2015 | Vasko | G05B 19/4185 726/1 |
| 2015/0189509 A1* | 7/2015 | Sheikh | H04W 12/08 726/4 |
| 2016/0070559 A1* | 3/2016 | West | G07C 5/008 717/172 |
| 2016/0323156 A1* | 11/2016 | Zakaria | H04W 24/02 |

* cited by examiner

CLIENT INITIATED VENDOR VERIFIED TOOL SETTING

CROSS-REFERENCE TO RELATED APPLICATIONS

This patent application claims the benefit of U.S. patent application Ser. No. 15/266,404 filed Sep. 15, 2016 entitled "Client Initiated Vendor Verified Tool Setting" which itself claims the benefit of priority from U.S. Provisional Patent Application 62/218,611 filed Sep. 15, 2015 entitled "Client Initiated Vendor Verified Tool Setting", the entire contents of which are incorporated herein by reference.

FIELD OF THE INVENTION

This invention relates to machine tool settings and more particularly to the provisioning of original equipment manufacturer validated tool settings and configurations generated by customers.

BACKGROUND OF THE INVENTION

Numerical control (NC) is the automation of machine tools that are operated by precisely programmed commands encoded on a storage medium, as opposed to controlled manually via hand wheels or levers, or mechanically automated via cams alone. Most NC today is computer (or computerized) numerical control (CNC), in which local and/or remote computers provide the data files for execution by the machine tool(s). CNC systems allow end-to-end component design to highly automated using computer-aided design (CAD) and computer-aided manufacturing (CAM) programs. The programs produce a computer file that is interpreted to extract the commands needed to operate a particular machine via a post processor, and then loaded into the CNC machines for production.

As a particular component might require the use of a number of different tools, e.g. drills, saws, etc., modern machines often combine multiple tools into a single "cell". In other installations, a number of different machines are used with an external controller and human or robotic operators move the component from machine to machine. In either case, the series of steps needed to produce any part is highly automated and produces a part that closely matches the original CAD design.

However, CNC relies upon the settings of the machine tool or tools required to achieve a specific action with respect to the piece part are well established, characterised, and reproducible machine tool to machine tool. For example, a drill tool commanded to move a piece part 1" (25 mm) and drill a 5/32" (4 mm) hole into 0.25" (6.25 mm) aluminum plate would be expected to achieve that without issue. However, cutting a 1" (25 mm) hole in 1" thick steel with a 1.5" (37.7 mm) chamfered profile on one side with a 0.5" (12.7 mm) plasma torch in a 2" (51 mm) square well may yield unpredictable results using the standard process. However, one manufacturing facility may have solved the issue through adjustments that they have made or has established a methodology to adjust a process to accommodate tool wear. But no one else knows this and must expend their own efforts to establish improvements.

Accordingly, it would be beneficial for manufacturers to be part of a service, free or subscription for example, that provide access to updated process parameters for machine tools that reflect scenarios encountered in manufacturing operations that are unusual, outside those the machine tool vendor specified, or are completely new as new materials, machine tool elements etc. are introduced. It would be further beneficial for the other manufacturers subscribing to the service to have confidence in the machine tool settings. Accordingly, it would be beneficial if the subscription service allowed manufacturers to access verified settings where the verification is performed by the machine tool manufacturer or machine tool element manufacturer.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to machine tool settings and more particularly to the provisioning of original equipment manufacturer validated tool settings and configurations generated by customers.

In accordance with an embodiment of the invention there is provided a method of providing control settings for an original equipment manufacturers (OEM's) machine tool by making them available to subscribers of a subscription service wherein the control settings were initially established by a user of the OEM's machine tool and validated by the OEM prior to their being available to subscribers of the subscription service.

In accordance with an embodiment of the invention there is provided a database comprising a machine tool control setting profile of a plurality of machine tool control setting profiles, each machine tool control setting profile established by a user of the machine tool and validated by the original equipment manufacturer.

In accordance with an embodiment of the invention there is provided executable software stored upon a non-transient physical medium, wherein the executable software when executed performs a process, the process comprising the steps of:

performing a hash upon local control settings relating to a predetermined process upon a machine tool, the local control settings stored locally to the machine tool;

performing a hash upon reference control settings relating to a predetermined process upon a machine tool, the reference control settings stored remotely to the machine tool by either an original equipment manufacturer of the machine tool or a machine tool element provider for the machine tool;

determining whether the local control settings are different from the reference control settings by comparing the hashes of the local control settings and the reference control settings; and upon a difference being detected at least one of:

automatically replacing the local control settings with the reference control settings;

providing an operator of the machine tool with an override option; and providing an operator of the machine tool with an option to indicate that the local control settings provide improved performance relative to the reference control settings and upon said indication pushing the local control settings to the one of the original equipment manufacturer of the machine tool and the machine tool element provider for the machine tool.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
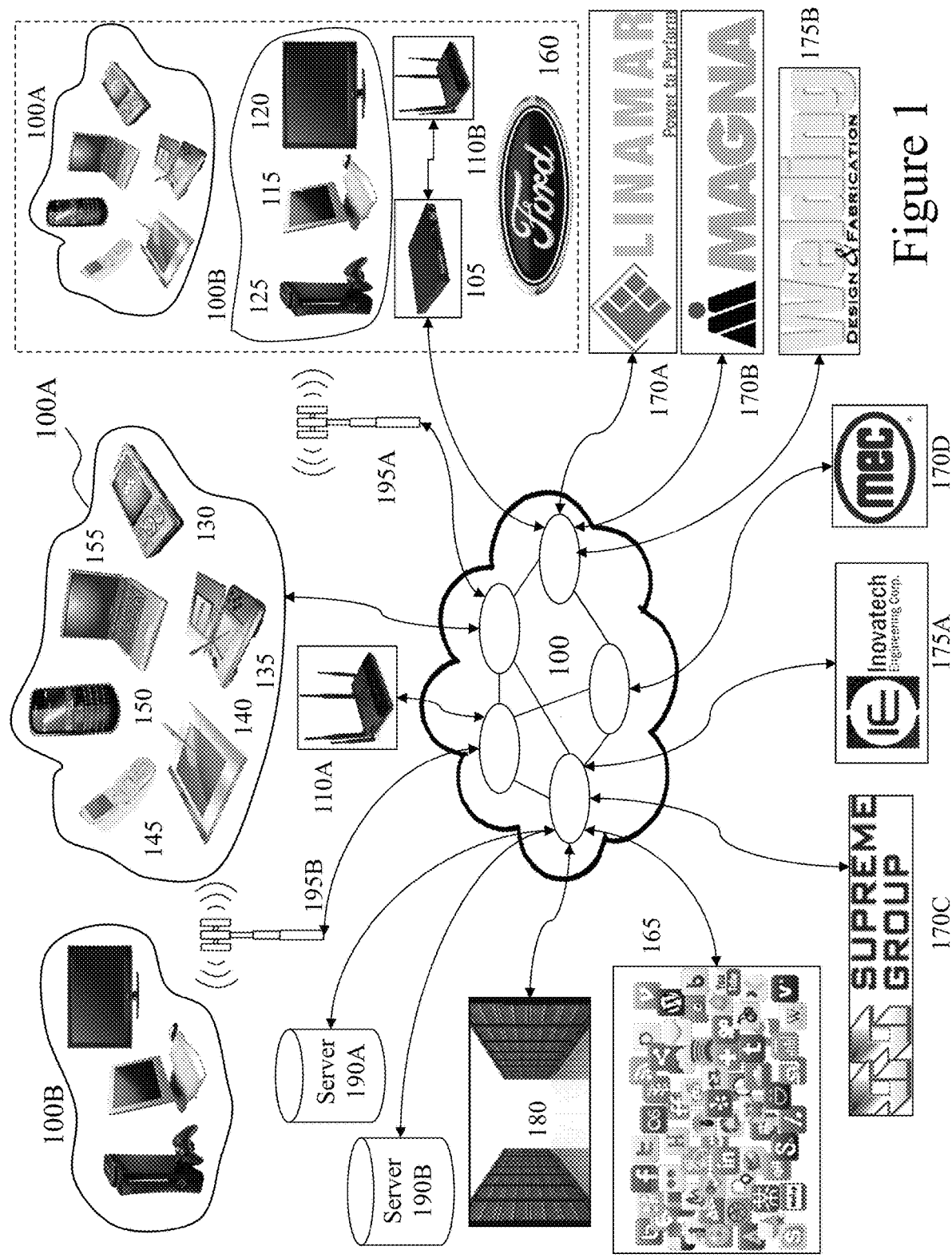
FIG. 1 depicts a network environment within which embodiments of the invention may be employed.

The present invention is directed to machine tool settings and more particularly to the provisioning of original equipment manufacturer validated tool settings and configurations generated by customers.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "machine tool" (tool) as used herein, and throughout this disclosure, refers to a machine for shaping or machining or assembling metal or other rigid materials, usually by cutting, boring, drilling, grinding, shearing, or other forms of deformation in conjunction with welding, brazing and other forms of material joining. Machine tools employ some sort of tool that does the cutting or shaping which may be fixed or removable/changeable. Machine tools generally have some means of constraining the workpiece and/or providing a guided movement of the parts of the machine and workpiece. Thus the relative movement between the workpiece and the cutting tool (which is called the toolpath) is controlled or constrained by the machine to at least some extent. Some machine tools may work on a single piece part at a time whilst others may work on multiple piece parts or generate multiple piece parts from a single piece of starting stock material. Some machine tools may only provide a single process, e.g. drilling, whilst other tools such as milling machines may provide multiple processes. Such machine tools may include, but not be limited to, drill presses, lathes, screw machines, milling machines, shears, saws, planers, grinding machines, electrical discharge machining, plasma cutters, laser cutters, laser engravers, grinders, electrical discharge welders, shot peening, and water jet cutters/surface machining.

A "profile" as used herein, and throughout this disclosure, refers to a computer and/or microprocessor readable data file comprising data relating to settings and/or limits and/or sequence for a machine tool or other item of manufacturing equipment.

Referring to FIG. 1 there is depicted a network environment 100 within which embodiments of the invention may be employed supporting machine tool systems, applications, and platforms (MTSAPs) according to embodiments of the invention. Such MTSAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, such as Ford™ for example, within which other first and second user groups 100A and 100B are disposed. Second user group 100B may also be connected to the network 100 via wired interfaces including, but not limited to, DSL, Dial-Up, DOC SIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, first manufacturer 170A, e.g. Linamar™; second manufacturer 170B, e.g. Magna™; steel fabricator 170C, e.g. Supreme Group™; manufacturing solutions provider 170D, e.g. Mayville Engineering Corp.; machine tool manufacturer 175A, e.g. Inovatech Engineering; and online chat/discussion/bulletin board/forum 175B, e.g. Welding Design and Fabrication (http://weldingweb.com/); as well as first and second servers 190A and 190B which together with others, not shown for clarity. Accordingly, a user employing one or more MTSAPs may interact with one or more such providers, enterprises, service providers, retailers, third parties etc. and other users. First and second servers 190A and 190B may host according to embodiments of the inventions multiple services associated with a provider of adult device systems, applications, and platforms (MTSAPs); a provider of a SOCNET or Social Media (SOME) exploiting MTSAP features; a provider of a SOCNET and/or SOME not exploiting MTSAP features; a provider of services to PEDS and/or FEDS; a provider of one or more aspects of wired and/or wireless communications; an Enterprise 160 exploiting MTSAP features; license databases; content databases; image databases; content libraries; customer databases; websites; and software applications for download to or access by FEDs and/or PEDs exploiting and/or hosting MTSAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides MTSAP features according to embodiments of the invention; execute an application already installed providing MTSAP features; execute a web based application providing MTSAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
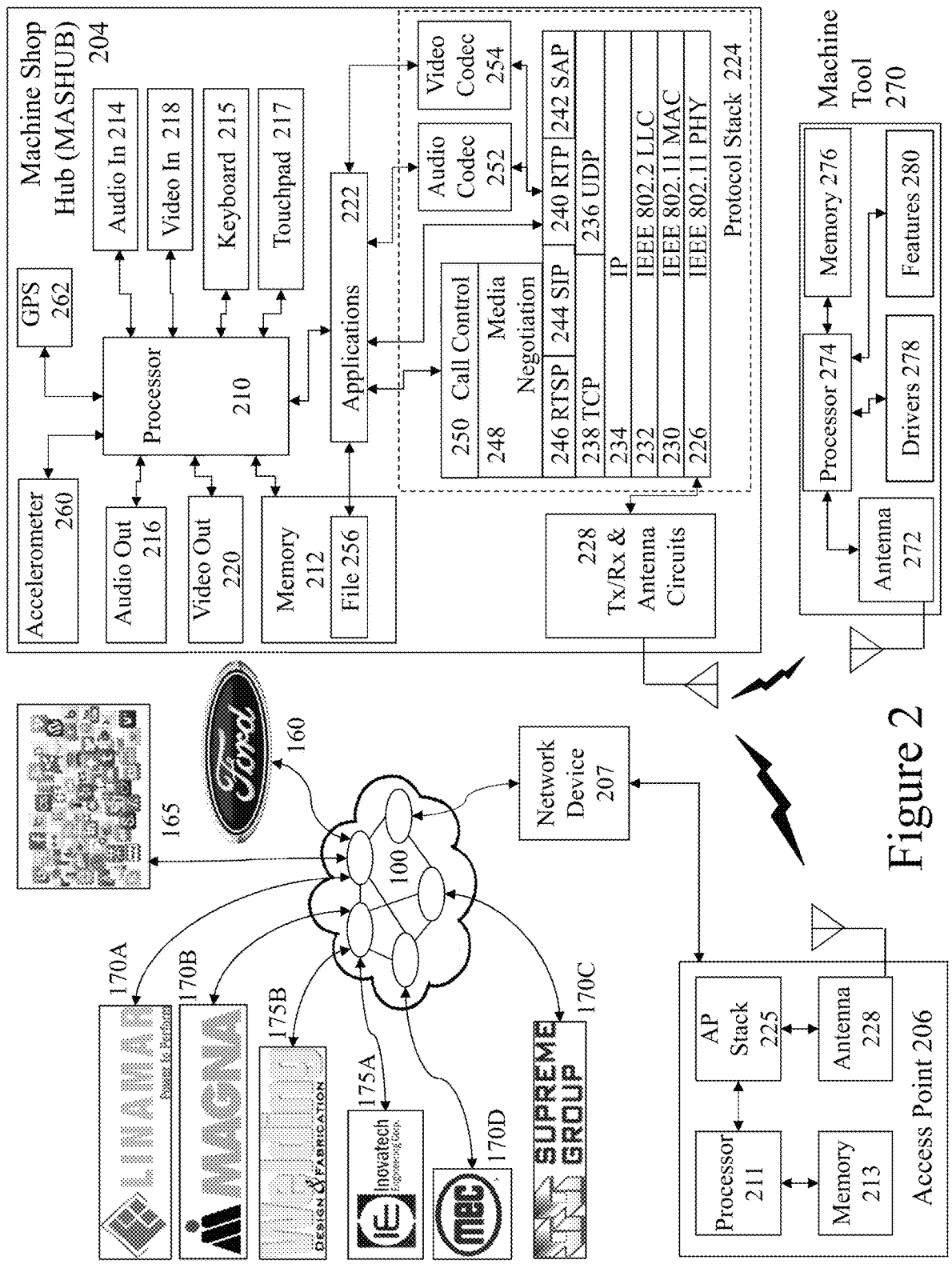
FIG. 2 depicts a machine shop hub supporting communications to a network such as depicted in FIG. 1 and as supporting embodiments of the invention with respect to machine tool settings and profiles.

Now referring to FIG. 2 there is depicted a Machine Shop Hub (MASHUB) 204 and network access point 207 supporting MTSAP features according to embodiments of the invention. MASHUB 204 may, for example, be a PED and/or FED and may include additional elements above and beyond those described and depicted. Also depicted within the MASHUB 204 is the protocol architecture as part of a simplified functional diagram of a system 200 that includes an MASHUB 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, first manufacturer 170A, e.g. Linamar™; second manufacturer 170B, e.g. Magna™; steel fabricator 170C, e.g. Supreme Group™; manufacturing solutions provider 170D, e.g. Mayville Engineering Corp.; machine tool manufacturer 175A, e.g. Inovatech Engineering; and online chat/discussion/bulletin board/forum 175B, e.g. Welding Design and Fabrication (http://weldingweb.com/); as well as first and second servers 190A and 190B and Enterprise 160, Ford™.

The MASHUB 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

MASHUB 204 may include an audio input element 214, for example a microphone, and an audio output element 216, for example, a speaker, coupled to any of processors 210. MASHUB 204 may include a video input element 218, for example, a video camera or camera, and a video output element 220, for example an LCD display, coupled to any of processors 210. MASHUB 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the MASHUB 204. The one or more applications 222 that are typically stored in memory 212 and are executable by any combination of processors 210. MASHUB 204 also includes accelerometer 260 providing three-dimensional motion input to the process 210 and GPS 262 which provides geographical location information to processor 210.

MASHUB 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Tx/Rx & Antenna Circuits 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206.

Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230. It would be apparent to one skilled in the art that elements of the MASHUB 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed MASHUBs represented by MASHUB 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted is Machine Tool (MACTO) 270 which is coupled to the MASHUB 204 through a wireless interface between Antenna 272 and Tx/Rx & Antenna Circuits 228 wherein the MASHUB 204 may support, for example, a national wireless standard such as GSM together with one or more local and/or personal area wireless protocols such as IEEE 802.11 a/b/g WiFi, IEEE 802.16 WiMAX, and IEEE 802.15 Bluetooth for example. The Antenna 272 is connected to Processor 274 and therein to Memory 276, Drivers 278, and Features 280. Accordingly, the MACTO 270 may operate as standalone device with factory installed control routines accessed through an interface on the MACTO 270, not shown for clarity, or through an application in execution upon the MASHUB 204. Subsequently, as described below one or more of these control routines may be modified, amended, deleted etc. whilst other new control routines may be created, acquired, installed etc.

Accordingly it would be evident to one skilled the art that the MACTO 270 with associated MASHUB 204 may accordingly download original software and/or revisions for a variety of functions supported by the drivers 278 and/or features 280. In some embodiments of the invention the functions may not be implemented within the original as sold MACTO 270 and are only activated through a software/firmware revision and/or upgrade either discretely or in combination with a subscription or subscription upgrade for example. Whilst the MASHUB 204, MACTO 270 and AP 206 are depicted exploiting wireless communications it would be evident that in other embodiments of the invention one or more of these wireless communication paths may be replaced with a wired connection or a non-wireless but unwired connection such as an optical link for example or not implemented and communications are through the AP 206 for example between MACTO 270 and MASHUB 204 or even via the network 100.

Figure 3A:
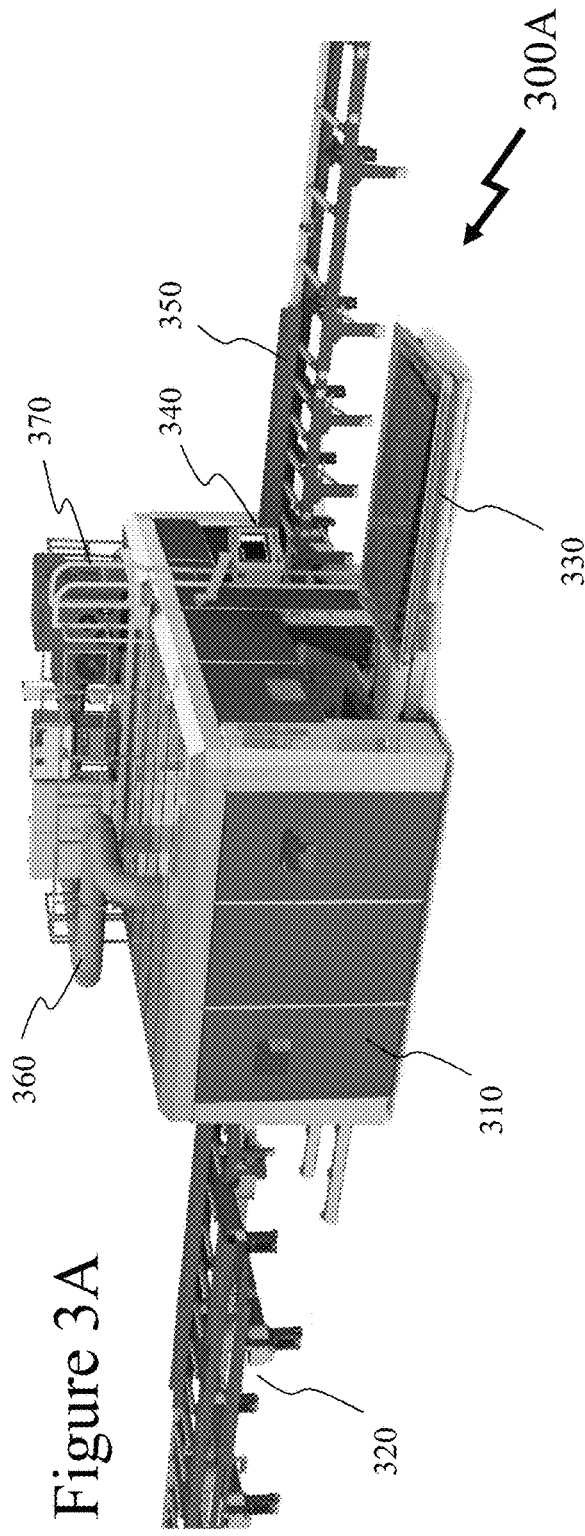
FIGS. 3A and 3B depict exemplary plasma cutting machine tool systems generating and exploiting configuration settings established and verified according to embodiments of the invention.
Figure 3B:
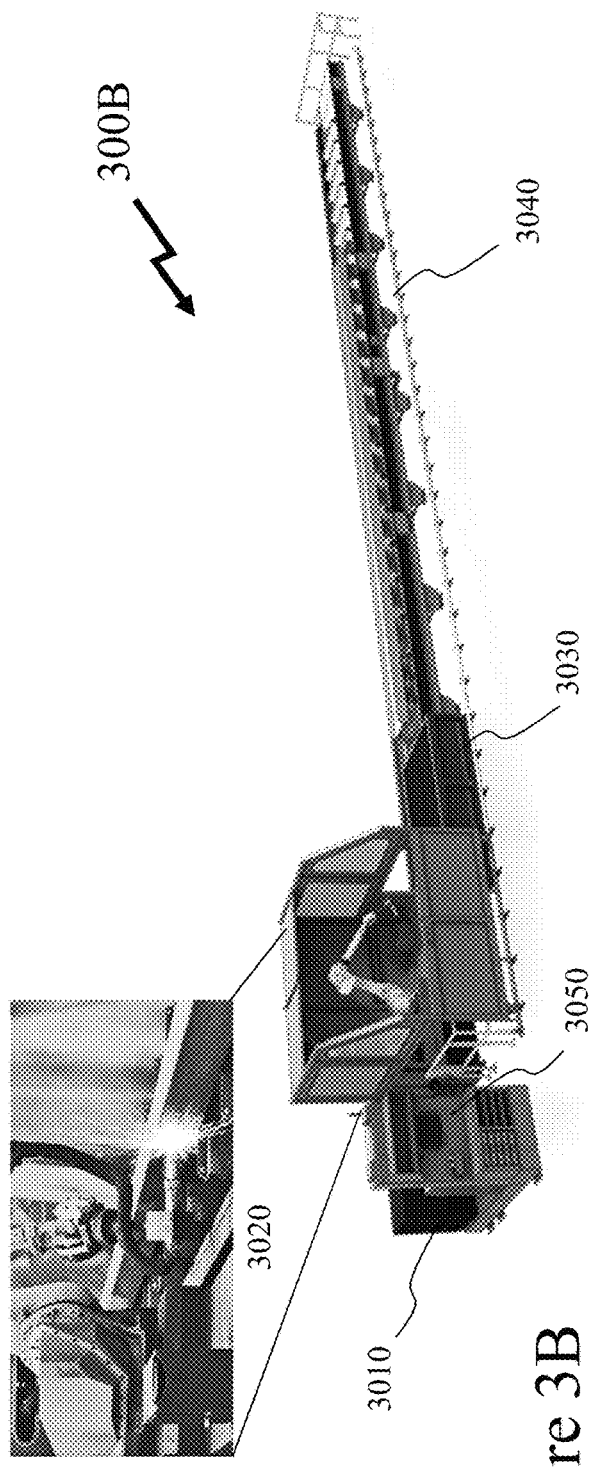

Now referring to FIGS. 3A and 3B there are depicted first and second schematics 300A and 300B of plasma cutting machine tool systems as manufactured by Inovatech Engineering which may generate and exploit machine tool settings/configuration profiles as established, verified, and acquired according to embodiments of the invention. Accordingly, each of the plasma cutting machine tool systems in first and second schematics 300A and 300B may be an example of a MACTO 270 in FIG. 2. Considering initially first schematic 300A in FIG. 3A then:

Robot enclosure 310, provides an environment containing fumes, reducing noise etc.;

Cross-transfer 320, allows different load/unload profiles to be employed as well as materials receipt/processed material delivery, etc. and saves time;

Plate table 330, provides base for sheet/plate as moved relative to plasma cutter where typical configurations include 6"×10" (2m×3m), 12'×10' (4m×3m), and 24'× 10" (8m×3m);

Operator station 340, wherein an industrial computer controls plasma robot, conveyors, plate table, etc. and displays messages, alarms, maintenance screens, plasma control settings etc.;

Infeed/outfeed conveyors 350; chain or belt driven conveyors allow material to be received from stock/prior MACTO 270 and/or transferred to finished stock/next MACTO 270.

Ventilation system 360, which provides automatic fume extraction and filtering etc.;

and

Plasma gas control etc. 370, with automated gas control etc. for different cutting processes adapted to plasma cutter head, material processed, etc.

Now referring to second schematic 300B in FIG. 3B then:

Plasma gas control etc. 3010, with automated gas control etc. for different cutting processes adapted to plasma cutter head, material processed, etc.

6-axis robot 3020, with plasma cutter head allowing control over head position, orientation and movement of plasma cutter head relative to the piece part independent of any motion of the piece part which as depicted is within an enclosure that moves along the profile table 3040 reducing overall space requirements;

Water 3030, optionally inserted in line for quenching, cutting stiffener plates, etc.;

Profile table 3040 which supports the piece-part(s) and allows for laser piece-part scanning and alignment of the piece-part on the profile table; and Operator station 3050, wherein an industrial computer controls plasma robot, conveyors, plate table, etc. and displays messages, alarms, maintenance screens, plasma control settings etc.

Accordingly, the operator stations 340 and 3050 in first and second schematics 300A and 300B respectively in FIGS. 3A and 3B (hereinafter operator station), acting for example as MACTO 270 with optional communications to a central machine shop system, e.g. MASHUB 204, or acting a MASHUB 204 in a stand-alone configuration provides the required control settings to the computer controlled elements of the plasma cutting machine tool system such as robot (not shown for clarity), plasma cutting tool, and plate table for example. These may be selected from a menu of control setting profiles defined, for example, by product name/product serial number etc. stored upon the operator station or alternatively the operator station retrieves the control setting profile from a remote system such as MASHUB 204. Accordingly, when the operator triggers execution of a machine tool profile (MACPRO) that defines the control settings of the plasma cutting system, in this instance although it would be evident that the MACTO 270 may be any other machine tool accepting computer numerical control (CNC) etc., together with the motion sequence of the robot and plate table as well as in other instances cross-transfer 320, infeed/outfeed conveyors 350, profile table 3050, etc.

Figure 4:
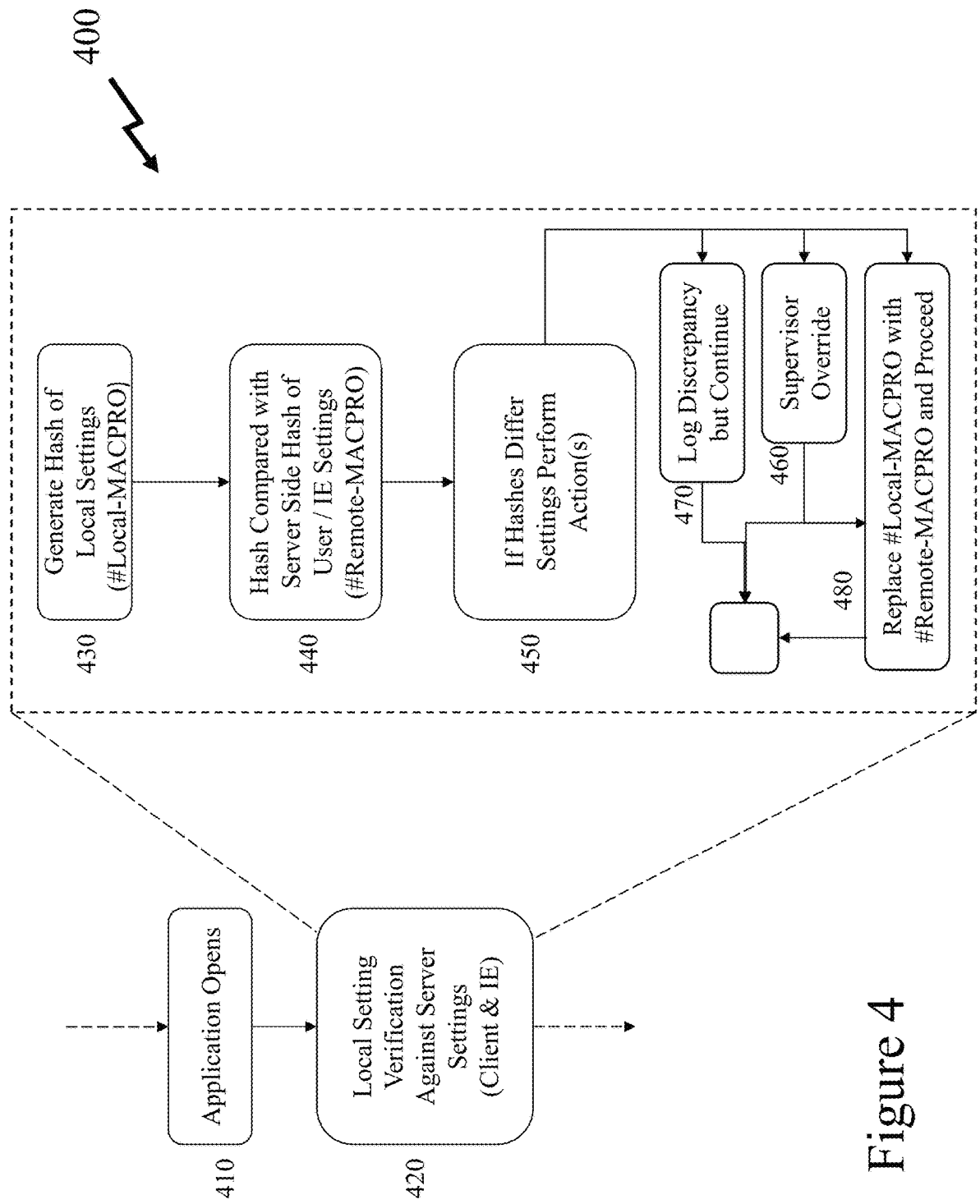
FIG. 4 depicts a verification sequence for local machine tool settings against server stored settings according to an embodiment of the invention.

Accordingly, when a user accesses an operator station to execute a MACPRO then the process flow 400 of FIG. 4 may be automatically executed wherein the controller application opens in step 410 to execute the selected MACPRO before in step 420 the process checks/verifies the local settings (Local-MACPRO) against server settings (Remote-MACPRO). The Remote-MACPRO may be that upon a client MASHUB 204 or a remote server, such as first or second servers 190A and 190B respectively. This step 420 may comprise for example:

Step 430, wherein a hash of the Local-MACPRO (# Local-MACPRO) is generated upon the MACTO 270;

Step 440, wherein a hash of the Local-MACPRO (# Remote-MACPRO) is generated upon the remote system, e.g. MASHUB 204 or first remote server 190A;

Step 450 wherein # Local-MACPRO ## Remote-MACPRO then one or more actions are initiated such as, for example:

Step 460 wherein a supervisor override is required to execute the local MACPRO otherwise the controller may proceed to step 480;

Step 470 wherein the discrepancy is logged and the process continues with the local MACPRO where additional information as to the discrepancy may be logged such as piece-parts, date/time, operator, company, location, machine etc. and process difference(s); and Step 480 wherein the local MACPRO is overridden with the remote MACPRO.

Figure 5:
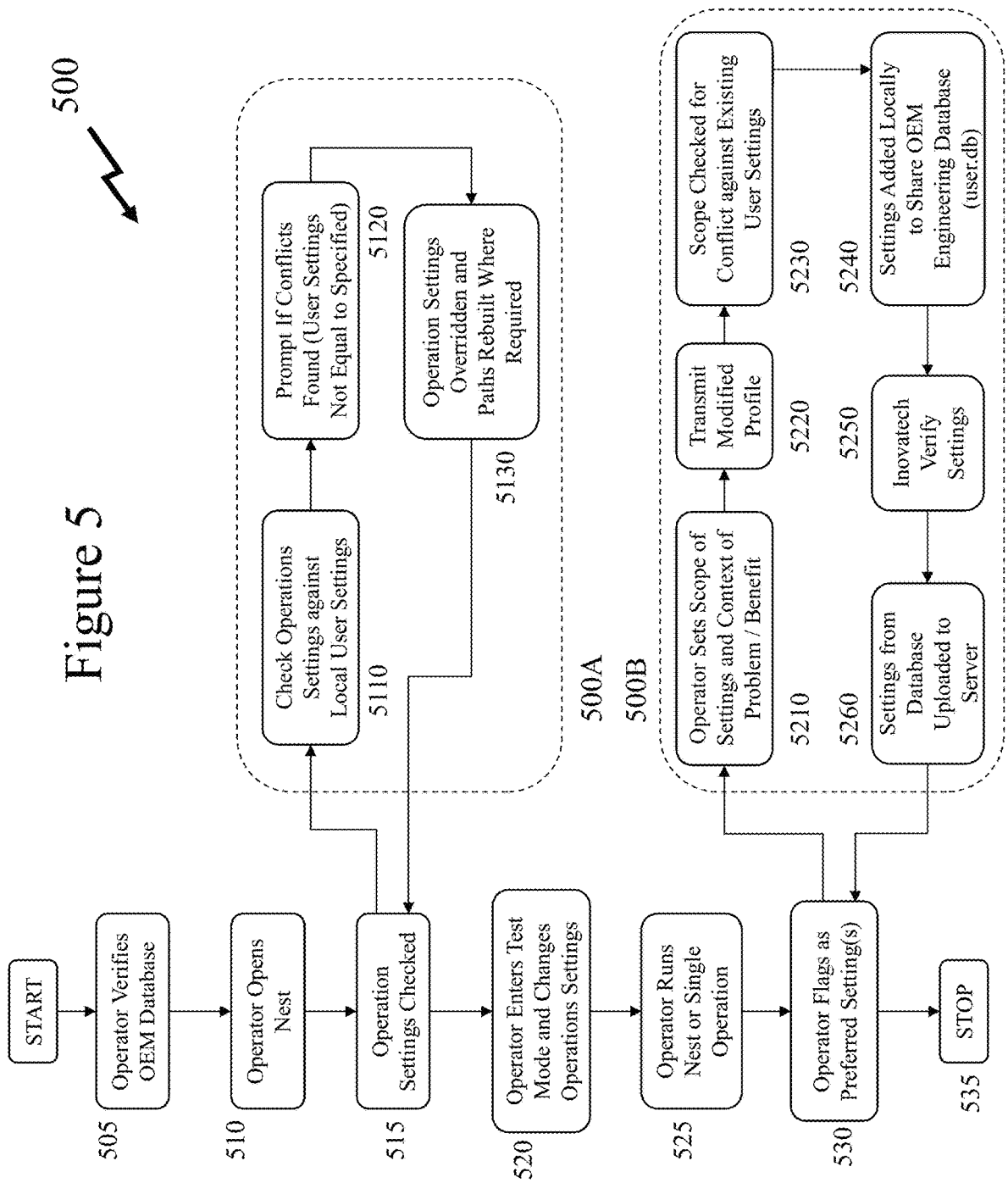
FIG. 5 depicts an exemplary process flow for machine tool settings according to an embodiment of the invention.

Now referring to FIG. 5 there is depicted an exemplary process flow 500 according to an embodiment of the invention. Accordingly, the process begins and at step 505 the operator verifies an OEM database and the process proceeds to step 510 wherein the operator opens a machine tool nest wherein the operation settings are checked in step 515 which is depicted as first sub-flow 500A although other processes may be employed, such as that depicted and described in respect of process flow 400 in FIG. 4. Within first sub-flow 500A the operation settings are checked against local user settings in step S110 wherein a prompt is generated in step S120 if a conflict is found wherein in step S130 the process proceeds to override the operation settings and paths are rebuilt where required.

Subsequently, in step 520 the operator establishes a test mode for the nest and changes the operations settings before proceeding in step 525 to run the nest or single operation with the modified settings. If as a result of the modified settings the operator achieves improved performance of a process, e.g. increasing cutting speed without degrading edge quality on a saw or cutting an improved 1" (25 mm) hole in 2" (51 mm) thick stainless steel with a 0.25" (12.7 mm) plasma cutter head or sidewall quality for milling a 0.25"×0.25" (6 mm×6 mm) groove into phosphor bronze, then the operator can flag these settings as preferred. Initially, the preferred settings are upon the MACTO 270 but may then be mirrored to the MASHUB 204 of that facility through the actions of the MTSAP in execution upon the MACTO 270 and/or MASHUB 204.

This flagging triggers a second sub-process 500B comprising steps S210 to S260 which are:

Step S210 wherein the operator is prompted to add some comments/notes with respect to the scope of the settings and context of the problem/benefit established;

Step S220 wherein the modified MACPRO is transmitted from the MACTO 270/MASHUB 204 to the server of the original equipment manufacturer (OEM);

Step S230 wherein the scope of the modified MACPRO is checked for conflict against existing user settings;

Step S240 wherein if there are no conflicts the OEM adds the MACPRO to their local engineering database;

Step S250 wherein the OEM executes a verification process upon the settings;

Step S260 wherein if the verification process is successful the settings are uploaded to the OEM's server wherein they are then accessible to those manufacturers who have subscribed to the OEM's MACPRO update subscription process.

The OEM may offer a subscription process wherein customers are able to access non-standard processes that the OEM has validated but not included within the original settings/configurations (MACPROs) of the MACTO and subsequently access updates on these and standard settings/configurations (MACPROs) prior to their general availability. As such subscribers obtain earlier access to production settings/profiles and/or access to validated/verified settings/profiles that were originally established by other manufacturers/enterprises etc. Accordingly, all users can benefit from the knowledge development within the wider array of customers/users of the MACTO or MACTOs. Optionally, within other embodiments of the invention user's may also be able to access non-validated MACPROs and seek to address limitations within these identified by the original customer and/or the OEM.

Figure 6:
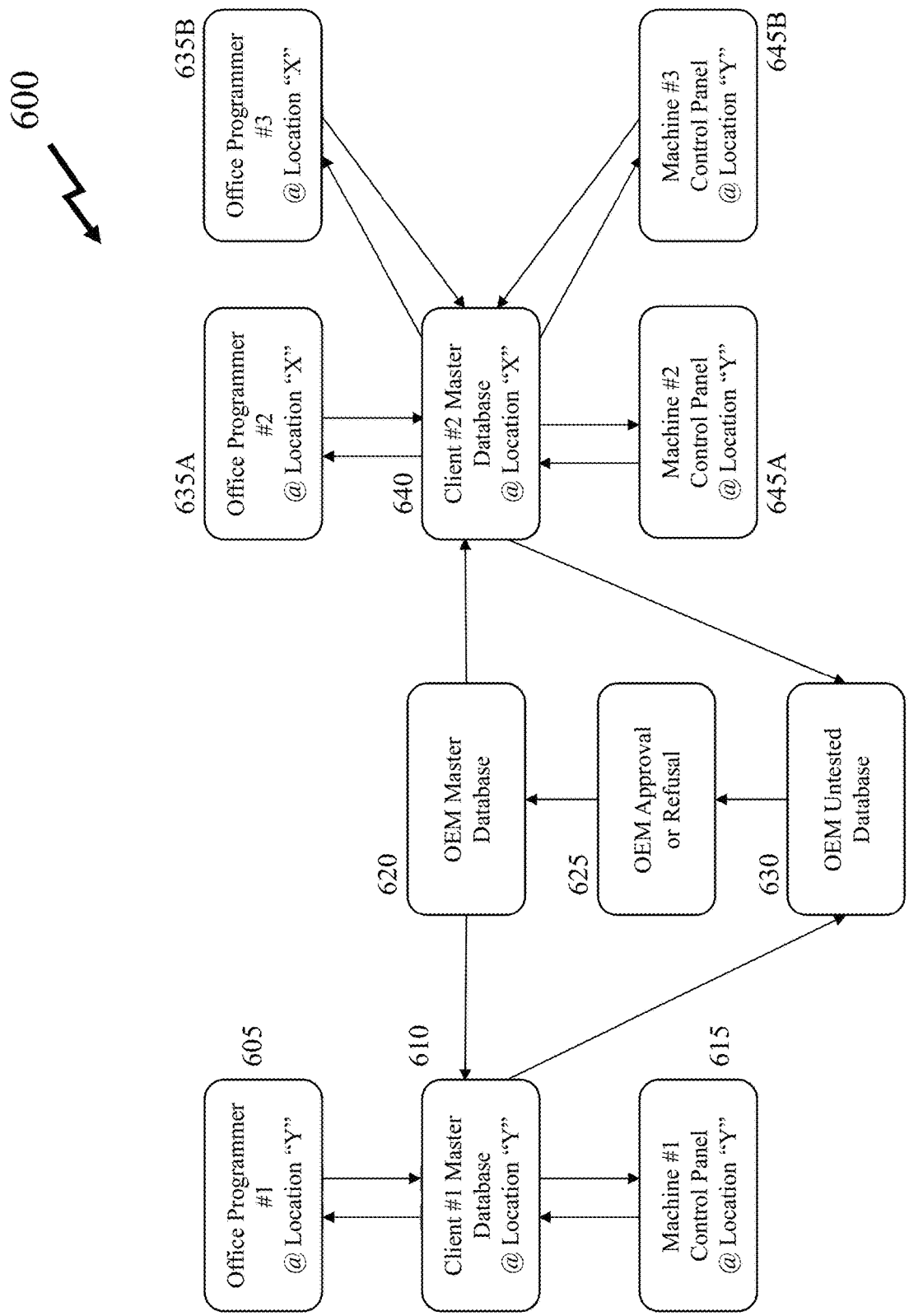
FIG. 6 depicts an exemplary process flow for machine tool settings according to an embodiment of the invention with a machine tool manufacturer controlled setting database.

Now referring to FIG. 6 there is depicted an example of this in process flow 600 wherein a first client has at a Location "Y" a MACPRO database 610 which provides MACPROs to their MACTOs 270 at that location, e.g. Machine #1 615. A CAD/CAM programmer 605 at that location may design/receive a piece-part which they then establish a computer numerical control for exploiting one or more MACPROs. For example, their design may require two MACPROs, one for steady cutting during a plate table movement sequence to cut a plate from a sheet of material and another for cutting holes which is triggered multiple times after subsequent plate table movements to the appropriate positions. The MACPRO database 610 receives MACPROs from the OEM Master Database 620, for example, at installation and commissioning of the Machine #1 and/or subsequently as a result of their subscription to the OEM MACPRO update program.

Similarly, a second client has at a Location "X" a MACPRO database 640 which provides MACPROs to their MACTOs 270 at that location, e.g. Machine #2 645A and Machine #3. CAD/CAM programmers #2 535A and #3 635B may similarly generate at that location processes for piece-parts. Again the MACPRO database 640 receives MACPROs from the OEM Master Database 620, for example, at installation and commissioning of the Machine #2 and/or Machine #3 subsequently as a result of their subscription to the OEM MACPRO update program. In each case the Client #1 and Client #2 master databases 610 and 640 may push modified profiles/settings to OEM untested database 630 wherein they are subsequently evaluated and tested/verified by the OEM leading to OEM approval or refusal 625 and these MACPROs being added to the OEM master database. The system may be configured to track approval or refusal with or without also tracking the operator providing say approval or refusal. A message may be sent to the originating operator in either instance or both instances.

It would be evident that Client #1 and Client #2 may be independent clients of the OEM or these may be different locations, subsidiaries, divisions, etc. of the same client. In some embodiments of the invention the client's subscription may be based upon a particular MACTO 270 or class of MACTO 270. In other embodiments of the invention the client's subscription may be based for example upon the manufacturer being a supplier to another manufacturer. For example, referring to FIG. 1, Enterprise 160 Ford™ may have subscription service relating to its vehicles and piece parts/assemblies that only approved manufacturers such as first manufacturer 170A, e.g. Linamar™ and second manufacturer 170B, e.g. Magna™. Similarly, steel fabricator 170C, e.g. Supreme Group™, may have its own subscription geared to its steel fabrication in contrast to aluminum, stainless steel, and titanium (for example) of Ford™ Accordingly, a MACTO 270 may be associated with multiple subscriptions if the manufacturer works within different customer driven subscriptions as well as subscribes to the MACTO OEM's service. Hence, first manufacturer Linamar™ 170A in FIG. 1 may subscribe to Enterprise 160 Ford™, steel fabricator 170C Supreme Group™ as customers and Inovatech Engineering as machine tool manufacturer 175A.

Whilst the discussions presented supra in respect of FIGS. 1 to 6 have been primarily presented with respect to settings of a machine it would be apparent to one of skill in the art that the profiles may alternatively be associated with a tool rather than the machine or with respect to a consumable of a tool and/or machine. For example, a 6-axis robot may have profiles associated with it. However, equally a plasma cutting tool associated with the 6-axis robot may have its own profiles which may be improved or extended for capabilities etc. independent of which robot supports and moves the plasma cutting tool or the new profile may apply to a subset of robots rather than none or all. Equally, a consumable such as a plasma jet head of the plasma cutting tool may have a profile or profiles associated with it independent or dependent upon plasma cutting tool etc.

It would be evident that within the preceding description the focus has been directed to the establishment of profiles for tools based upon an organization and these being shared via a service to other organizations within or external to the organization. However, it would be apparent that the profiles may be tracked by user and/or user accounts such that an operator "A" within an organization can establish a new process that is subsequently trialed by operators "B" and "C" before being approved within the organization. It would evident to one skilled in the art that the embodiments of the invention support such profile generation/verification/authentication at multiple levels within a hierarchy, such as for example within a single manufacturing cell, across multiple manufacturing cells, within a single manufacturing plant, across multiple manufacturing plants, within a single organization, and across multiple organizations.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof. Databases as referred to herein may also refer to digital repositories of content or other digitally stored content within a collection which may be indexed or non-indexed.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a remote server comprising a first microprocessor, a first memory storing first executable instructions for execution by the first microprocessor and a first network interface for interfacing the remote server to a communications network, the first executable instructions configuring the remote server to:
receive a set of control settings for a predetermined process from a machine tool via the communications network;
provide the set of control settings to an original equipment manufacturer (OEM) of the machine tool;
receive an indication of a verification established by the OEM, the verification verifying the set of control settings for the predetermined process;
transmit the verified set of control settings to a remote storage accessible to the remote server and users of other machine tools provided by the OEM who are subscribers to a subscription service; and
operate at least one of the other machine tools according to the verified tool settings.

2. The system according to claim 1, further comprising the original equipment manufacturer's (OEM's) machine tool comprising a second microprocessor, a user interface, a second memory storing first executable instructions for execution by the second microprocessor and a second network interface for interfacing the machine tool to a communications network, wherein the second executable instructions configure the machine tool to:
receive via the user interface first inputs from a user of the machine tool; establish in dependence upon the first inputs the control settings relating to the predetermined process executable by the machine tool; and transmit the control settings to the remote server.

3. The system according to claim 1, wherein the subscription service is established by at least one of the OEM and a manufacturer sub-contracting piece-part manufacturing to a plurality of third parties.

4. The system according to claim 1, wherein the first executable instructions further configure the remote server to:
receive another set of control settings for another predetermined process from another machine tool via the communications network;
provide the set of control settings to an original equipment manufacturer (OEM) of the machine tool;
receive an indication of a verification failure established by the OEM, the verification failure relating to the another set of control settings for the another predetermined process; and
transmit the non-verified another set of control settings to the remote storage accessible to the remote server and other users of other machine tools provided by the OEM who are subscribers to a subscription service.

5. The system according to claim 4, wherein the set of control settings for the predetermined process from the machine tool are the another set of control settings for the another predetermined process from the another machine tool with modifications.

6. The system according to claim 1, wherein the first executable instructions further configure the remote server to:
receive at least one of comments and notes from the machine tool generated by the user of the machine tool; and
transmit the at least one of the comments and the notes to the remote storage for storage in association with the set of control settings.

7. A system comprising:
a machine tool comprising a first microprocessor, a user interface, a first memory storing first executable instructions for execution by the first microprocessor, and a first network interface for interfacing the machine tool to a communications network, wherein the first executable instructions configure the machine tool to:
establish a test mode in dependence upon an indication from an operator of the machine tool via the user interface;
establish a modified set of control settings for a predetermined process to be performed by the machine tool in dependence upon one or more modifications established by the operator with respect to a set of control settings;
execute the modified set of control settings;
receive an indication from the operator that the modified set of control settings are preferred;
prompt the operator to enter at least one of comments and notes with respect to the modified set of control settings upon receipt of the indication;
establish at least one of the comments and the notes in dependence upon data entered by the operator via the user interface;
associate the at least one of the comments and the notes with the modified set of control settings; and
transmit the modified set of control settings and the associated at least one of the comments and the notes to at least one of a first server associated with an enterprise associated with the machine tool and a second server associated with an original equipment manufacturer (OEM); and
the second server comprising a second microprocessor, a second memory storing second executable instructions for execution by the second microprocessor and a second network interface for interfacing the second server to the communications network, the second executable instructions configuring the second server to:
receive the modified set of control settings for the predetermined process from the machine tool via the communications network;
receive an indication of a verification established by the OEM, the verification relating to the modified set of control settings for the predetermined process;
transmit the verified modified set of control settings to a remote storage accessible to the remote server and other operators of other machine tools provided by the OEM who are subscribers to a subscription service; and
operate at least one of the other machine tools according to the verified tool settings.

8. The system according to claim 7, wherein the second executable instructions further configure the second server to:
establish whether a conflict exists between the modified set of control settings for the predetermined process and existing sets of control settings for the predetermined process; and
upon determining no conflict exists storing the modified set of control settings within an engineering database of the OEM for verification.

9. The system according to claim 7, wherein the first executable instructions further configure the machine tool to:
access a database stored upon a remote server also connected to the communications network;
retrieve a machine tool control setting profile of a plurality of machine tool control setting profiles from the database, each machine tool control setting profile established by modifying a default tool control setting profile of another machine tool associated with the tool control setting profile by a first operator of the another machine tool; and
enable a second operator of the machine tool to execute the machine tool control setting profile of the plurality of machine tool control setting profiles upon the machine tool, wherein the machine tool is operated according to the executed machine tool control setting profile; wherein
the machine tool control setting profile of the plurality of machine tool control setting profiles has been validated by the original equipment manufacturer (OEM) of the machine tool associated with the machine tool control setting profile of the plurality of machine tool control setting profiles; and
the second operator is not associated with the OEM except via a subscription to a subscription service providing access to the plurality of machine tool control setting profiles established by other operators of other machine tools associated with the machine tool control setting profile of the plurality of machine tool control setting profiles and validated by the OEM of each machine tool of the other machine tools associated with the machine tool control setting profile of the plurality of machine tool control setting profiles.

10. The system according to claim 9, wherein the subscription service is established by at least one of:
an OEM of the machine tool of the other machine tools associated with the machine tool control setting profile of the plurality of machine tool control setting profiles; and
a manufacturer sub-contracting piece-part manufacturing to a plurality of third parties.

11. The system according to claim 7, further comprising a second machine tool comprising a second microprocessor, a second user interface, a second memory storing second executable instructions for execution by the second microprocessor, and a second network interface for interfacing the machine tool to a communications network, wherein the second executable instructions configure the machine tool to:
perform a hash upon local control settings relating to a predetermined process upon the machine tool, the local control settings stored locally to the machine tool;
perform a hash upon reference control settings relating to the predetermined process, the reference control settings stored remotely upon a first remote storage accessible to the machine tool via the communications network;
determine whether the local control settings are different from the reference control settings by comparing the hashes of the local control settings and the reference control settings; and
upon a difference being detected at least one of:
automatically replace the local control settings with the reference control settings;
provide an override option; and
provide the operator of the machine tool with an option to indicate that the local control settings provide improved performance relative to the reference control settings and upon said indication pushing the local control settings to a second remote storage accessible to the machine tool via the communications network; wherein
the first remote storage and second remote storage are associated with either an original equipment manufacturer of the machine tool or a provider of a machine tool element for the machine tool, and wherein the machine tool is operated according to either the local control settings or the reference control settings.

12. The system according to claim 11, wherein the second executable instructions further configure the machine tool to:
establish an indication of override option upon a display forming part of the machine tool;
request the override in dependence upon an indication of the override option being selected;
establish a verification of a supervisor override entry made via the user interface; and
enable execution of the local control settings upon verification of the supervisor.

13. The system according to claim 11, wherein the first executable instructions further configure the machine tool to:
determine whether the local control settings are executed when they are different to the reference control settings; and
log additional information relating to the execution; wherein
the additional information comprises one or more of an identifier of a piece part manufactured with the local control settings, a date, a time, an identity of the operator, a location of the machine tool, an identity of the machine tool, and differences between the local control settings and the reference control settings.

14. The system according to claim 7, wherein the first executable instructions further configure the machine tool to:
perform a hash upon local control settings relating to a predetermined process upon the machine tool, the local control settings stored locally to the machine tool;
perform a hash upon reference control settings relating to the predetermined process, the reference control settings stored remotely upon a first remote storage accessible to the machine tool via the communications network;
determine whether the local control settings are different from the reference control settings by comparing the hashes of the local control settings and the reference control settings; and
upon a difference being detected at least one of:
automatically replace the local control settings with the reference control settings;
provide an override option; and
provide the operator of the machine tool with an option to indicate that the local control settings provide improved performance relative to the reference control settings and upon said indication pushing the local control settings to a second remote storage accessible to the machine tool via the communications network; wherein
the first remote storage and second remote storage are associated with either an original equipment manufacturer of the machine tool or a provider of a machine tool element for the machine tool, and wherein the machine tool is operated according to either the local control settings or the reference control settings.

15. The system according to claim 14, wherein the first executable instructions further configure the machine tool to:
establish an indication of override option upon a display forming part of the machine tool;
request the override in dependence upon an indication of the override option being selected;
establish a verification of a supervisor override entry made via the user interface; and
enable execution of the local control settings upon verification of the supervisor.

* * * * *